Apr. 10, 1923.

O. SMITH 1,451,450

CAN FEEDING DEVICE

Filed June 6, 1922     2 sheets-sheet 1

Inventor
OTTO SMITH
By Dewey, Strong, Townsend and Loftus
Attys

Apr. 10, 1923. 1,451,450
O. SMITH
CAN FEEDING DEVICE
Filed June 6, 1922 2 sheets-sheet 2

Inventor
OTTO SMITH.

Patented Apr. 10, 1923.

1,451,450

UNITED STATES PATENT OFFICE.

OTTO SMITH, OF HONOLULU, HAWAII, ASSIGNOR TO CALIFORNIA PACKING CORPORATION, OF SAN FRANCISCO, CALIFORNIA, A CORPORATION OF NEW YORK.

CAN-FEEDING DEVICE.

Application filed June 6, 1922. Serial No. 566,386.

*To all whom it may concern:*

Be it known that I, OTTO SMITH, a citizen of the United States, residing at city of Honolulu, Territory of Hawaii, and United States of America, have invented new and useful Improvements in Can-Feeding Devices, of which the following is a specification.

This invention relates to a can feeder and especially to a device for transferring cans from loaded trays to a conveyor, whereby they are delivered to a can labelling machine.

The object of the present invention is to generally improve and simplify devices of the character described, and especially to provide a manually actuated feeding device whereby cans may be transferred from loaded trays to a conveyor in a rapid and efficient manner, and whereby correct positioning of the cans on said conveyor will be insured and time and labor minimized. Further objects will hereinafter appear.

One form which my invention may assume is exemplified in the following description and illustrated in the accompanying drawings, in which Fig. 1 is a plan view of the can feeding device.

Figure 3:
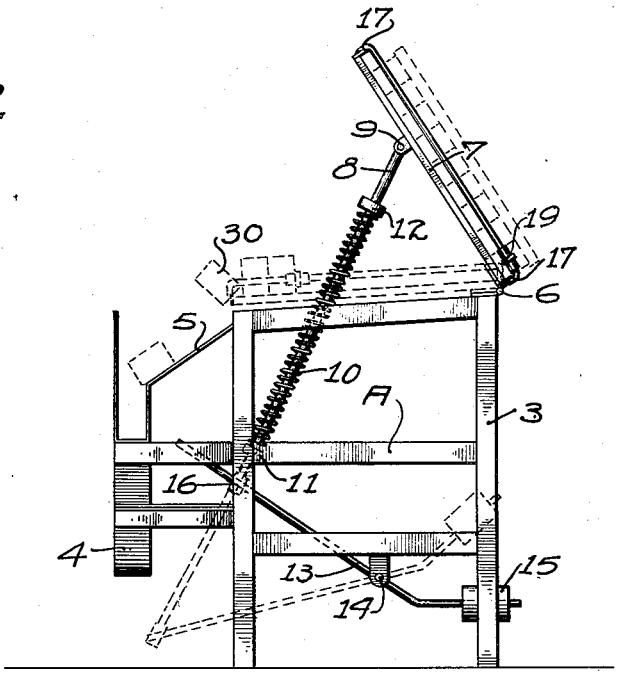
Fig. 3 is an end view.

Referring to the drawings in detail, A indicates in general a suitably constructed frame, consisting of legs 3, by which are supported an inclined chute 4 and an inclined transferring plate 5. Hingedly secured to one side of the frame, as at 6, is a table 7 which is normally held in an elevated inclined position as shown in Fig. 3. This position is maintained by a rod 8 pivotally attached to the lower side of the table as at 9, a spring 10 surrounding the rod and interposed between a fixed support 11 in the frame, and a collar 12 secured on the rod; said position being further maintained by a lever 13 pivotally supported as at 14 in the frame, on one end of which is mounted a counterweight 15, and the other end of which is connected to the rod at at 16. Secured at each end of the table, in brackets 17, is a rod 18; there being two rods, one at each end of the table, and slidably mounted on the rods and guided thereby is a transversely arranged rake or bar 19 provided with extending handle sections 20. To maintain a right-angular position between the rake and the rods 18, or parallel positioning between the rake and the sides of the table, guide tubes, such as shown at 21, are employed. These tubes are slidably mounted on the rods 18 and the rake proper is secured thereto; these elongated guides insuring the parallelism required.

Figure 1:
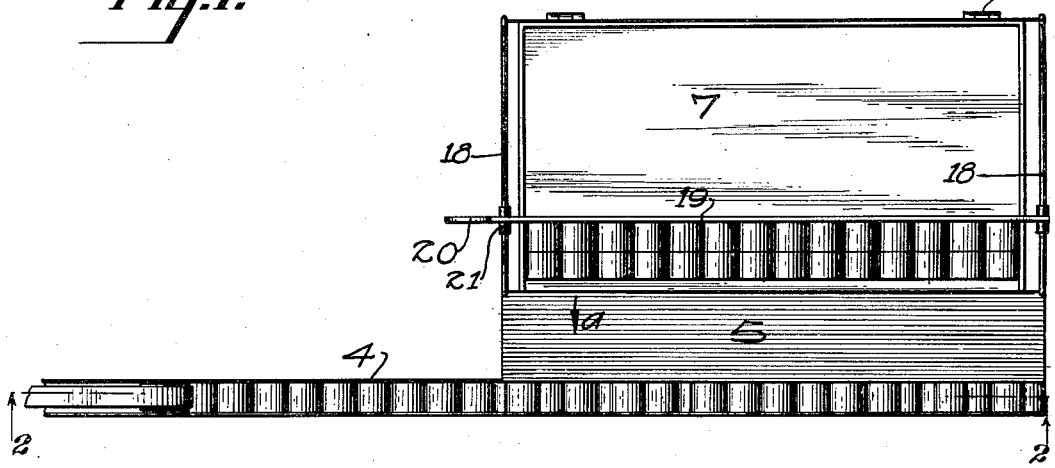
Figure 2:
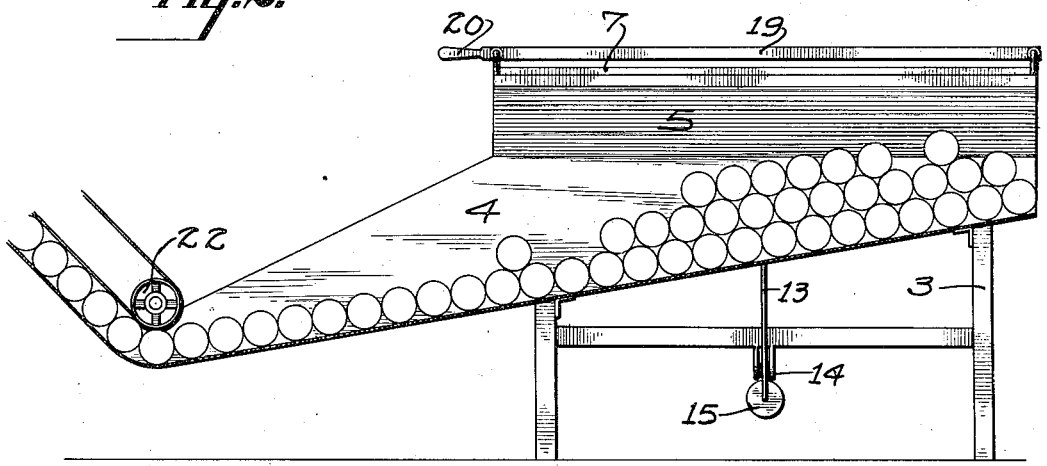
Fig. 2 is a central, vertical, longitudinal section taken on line 2—2, Fig. 1.
Figure 4:
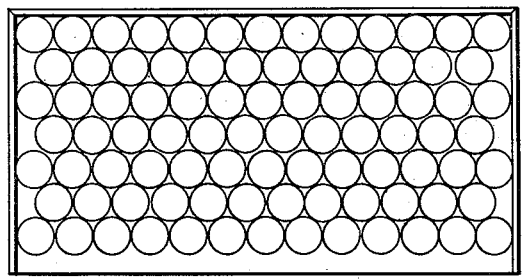
Fig. 4 is a plan view of a tray showing the cans placed on end.

The present device is particularly intended for delivering cans to a can labelling machine, and as such is the case it is essential that the cans be delivered to the conveyor of the labelling machine, indicated at 22, in such a maner that they will roll freely. In other words the ends of the cans should be parallel with the sides of the chute 4 and they will, therefore, roll freely down through said chute to the conveyor 22 when transferred from the table 7 to the chute. It might further be stated that the cans when removed from the cooker or other processing machine, through which they are passed, are loaded onto trays, they may in this instance be placed with their ends up, as shown in Fig. 4, or they may be placed on their sides as shown in Fig. 1. The trays so loaded are placed on the table 7 and this table, due to the weight of the tray and the cans, will automatically assume the horizontal position shown in Fig. 1, that is the tension of the spring 10 and the position of the counterweight are such that depression of the table to assume a horizontal position will be permitted. The moment the cans have been placed in position and the tray removed, it will only be necessary for the operators to pull the rake in the direction of arrow *a*, that is two operators are preferably employed. These operators grasp the handles 20 and exert a pull thereon in the direction of arrow *a*. The cans are thus slowly swept off the tray and as each row of cans reaches the ledge of the table, as indicated at 30, it will be seen that it will topple over and fall on the inclined plate 5, the incline of this plate being such that the cans will slide by gravity into the chute 4. If the cans are placed on their sides, as shown in Fig. 1, it will be seen that the cans will topple over and land on their ends when striking the inclined plate 5, and as this is sufficiently inclined to permit them to slide down by gravity, it is obvious that they will land on their sides in the chute 4 and will here roll by gravity down to the conveyor 22, from where they are transferred to the labelling machine. Again, if the cans are placed on end, as shown in Fig. 4, it can be seen that they will retain this position when they are transferred from the tray to the inclined plate 5, and that they will again slide by gravity into the conveyor and thus assume the position required. The empty tray is of course first removed and the moment the cans have been swept off, the table will again automatically return to the inclined position shown in Fig. 3. A full tray will again be placed thereon and the operation will be repeated.

Heretofore it has been common practice to transfer the cans from the trays to the conveyor 22 by hand. This takes considerable time and labor as it is almost impossible for an operator to pick up more than two cans at a time. In the present instance a whole tray is unloaded in a very short time and correct positioning of the cans in the chute, before delivery to the conveyor 22, is insured without further attention or labor on the part of the operators. Work is in this manner quickly and efficiently accomplished and numerous operators can be dispensed with.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. A device of the character described comprising an elevated support adapted to receive trays loaded with cans, an inclined plate leading from the support, and a trough running parallel with said inclined plate and downwardly inclined to permit cans to roll and discharge by gravity through the same, and said trough having a width equal to the height of the can.

2. A device of the character described comprising a conveyor, an elevated support on one side thereof adapted to receive trays loaded with cans, an inclined plate leading from the support to the conveyor, and means for sweeping the cans from the tray in row formation and transferring them to the inclined plate, from where they slide by gravity into the conveyor.

3. A device of the character described comprising an inclined trough, an inclined plate leading into the trough and disposed on one side thereof, a table disposed on one side of said plate and adapted to receive cans supported on their ends, and means for transferring the cans while so supported from the table to the inclined plate, from where they slide by gravity into the trough and discharge from the trough by rolling downwardly through the same.

4. In a device of the character described an inclined chute, a conveyor connected with said chute, an inclined plate on one side of the chute, and means for delivering cans to said plate to permit them to slide by gravity into the chute, said means comprising a table and a rake slidably mounted with relation to the table and adapted to transfer cans from the table to the inclined plate, from where they are adapted to slide by gravity into the chute.

5. A can feeding device comprising a frame, a table hingedly secured to the frame and adapted to assume a normally inclined position, an inclined chute on one side of the table, an inclined plate leading from the table to said chute, means permitting horizontal positioning of the table when a tray of cans is placed thereon, said means elevating the table when the cans and tray are removed, and means for transferring the cans from the tray and the table to the inclined plate, from where they slide by gravity into the chute.

6. A can feeding device of the character described, comprising a frame, a table mounted thereon for the reception of trays loaded with cans, a rake movable across the face of the table, and engageable with the cans to remove them from the tray, and an inclined plate disposed at one end of the table and adapted to receive the cans as they are moved off the tray, said plate being disposed on an angle which will permit the cans to slide off by gravity.

7. A can feeding device of the character described, comprising a frame, a table mounted thereon for the reception of trays loaded with cans, a rake movable across the face of the table, and engageable with the cans to remove them from the tray, an inclined plate disposed at one end of the table and adapted to receive the cans as they are moved off the tray, said plate being disposed on an angle which will permit the cans to slide off by gravity, and means for removing the cans when they leave the inclined plate.

OTTO SMITH.